United States Patent

Harada

(10) Patent No.: US 6,336,585 B1
(45) Date of Patent: Jan. 8, 2002

(54) MEMORY CARD INSERTION TYPE ELECTRONIC EQUIPMENT AND APPARATUS FOR WRITING TO THE MEMORY CARD

(75) Inventor: Seiichi Harada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/182,183

(22) Filed: Oct. 30, 1998

(30) Foreign Application Priority Data

Oct. 30, 1997 (JP) .............................. 9-298446

(51) Int. Cl.[7] .............................................. G06K 5/00
(52) U.S. Cl. ..................... 235/380; 235/382; 705/44; 705/67
(58) Field of Search ................................. 235/425, 379, 235/382, 449, 381, 380, 492, 441; 902/1, 2, 4, 5, 26, 27; 705/41, 42, 44, 67, 75

(56) References Cited

U.S. PATENT DOCUMENTS

| | | | | |
|---|---|---|---|---|
| 3,544,769 A | * | 12/1970 | Hedin | 235/61.9 |
| 4,139,893 A | * | 2/1979 | Poland | 364/706 |
| 4,277,837 A | * | 7/1981 | Stuckert | 364/900 |
| 4,305,059 A | * | 12/1981 | Benton | 340/825.33 |
| 4,453,074 A | * | 6/1984 | Weinstein | 235/380 |
| 4,575,621 A | * | 3/1986 | Dreifus | 235/380 |
| 4,746,788 A | * | 5/1988 | Kawana | 235/380 |
| 4,782,529 A | * | 11/1988 | Shima | 380/44 |
| 5,068,894 A | * | 11/1991 | Hoppe | 235/379 X |
| 5,189,288 A | * | 2/1993 | Anno et al. | 235/386 |
| 5,343,530 A | * | 8/1994 | Viricel | 705/67 |
| 5,379,344 A | * | 1/1995 | Larsson et al. | 235/380 X |
| 5,383,413 A | * | 1/1995 | Hayashi | 112/121.12 |
| 5,401,950 A | * | 3/1995 | Yoshida | 234/487 |
| 5,434,395 A | * | 7/1995 | Storck et al. | 235/380 |
| 5,747,786 A | * | 5/1998 | Cargin, Jr. et al. | 235/462.46 |
| 5,748,737 A | * | 5/1998 | Dagger | 380/24 |
| 5,892,211 A | * | 4/1999 | Davis et al. | 235/380 |
| 5,923,759 A | * | 7/1999 | Lee | 235/380 |
| 6,068,184 A | * | 5/2000 | Barnett | 235/379 |
| 6,069,647 A | * | 5/2000 | Sullivan et al. | 348/5.5 |
| 6,094,486 A | * | 6/2000 | Marchant | 380/52 |

FOREIGN PATENT DOCUMENTS

| | | | |
|---|---|---|---|
| JP | 4-338823 | | 11/1992 |
| JP | 6-150077 | * | 5/1994 |
| JP | 10-40323 | * | 2/1998 |
| JP | 11-134189 | * | 5/1999 |
| JP | 11-252069 | * | 9/1999 |

OTHER PUBLICATIONS

International Standard, "Information technology—Security techniques—Data integrity mechanism using a cryptographic check function employing a block cipher algorithm", ISO/IEC 9797, Apr. 1994, pp. 1–8.

* cited by examiner

*Primary Examiner*—Michael G. Lee
*Assistant Examiner*—Jared J. Fureman
(74) *Attorney, Agent, or Firm*—Venable; Catherine M. Voorhees

(57) ABSTRACT

A memory card insertion type electronic equipment reads authentication data from a memory card, decodes the read authentication data to a set of information by using a secret key, and compares the data read from an application program, which has been stored in the memory card, according to the address of the set of information with the data of the set of information in order to check the memory card for authenticity. There is also provided a memory card writing apparatus that encodes, by using a secret key, a set of information composed of an address generated at random and the data read from an application program, which is run on the memory card insertion type electronic equipment, according to the address, and writes the encoded set of information as the authentication data in the memory card.

10 Claims, 13 Drawing Sheets

MEMORY CARD INSERTION TYPE ELECTRONIC EQUIPMENT AND APPARATUS FOR WRITING TO THE MEMORY CARD

BACKGROUND OF THE INVENTION

1. Field of the Invention

The present invention relates to a memory card insertion type electronic equipment into which a memory card, in which an application program for a system to use has been stored, is inserted so as to use the application program, and an apparatus for writing an application program to the memory card.

Stored in the memory cards are application programs that are different, for example, for each memory card issuer according to the systems to use therewith. Diverse types of transactions, management, etc. can be carried out by setting such a memory card on the electronic equipment.

2. Description of Related Art

The application programs stored in memory cards are used for the transaction systems at banks or shops, the incoming and outgoing control systems at facilities, and medical examination systems in medical treatment. For instance, there is an electronic transaction system employing electronic money for the transactions made at shops. In such an electronic transaction system, a sales clerk receives an IC card to which a customer, namely, the user of the IC card, has transferred money in advance from his or her account thereto, inserts the IC card in portable electronic equipment, and presses appropriate keys on the control console of the portable electronic equipment to enter a sales amount. The customer then presses a key for confirmation of the sales amount to initiate transfer of the sales amount from the IC card to the memory card or the memory of the portable electronic equipment so as to make a payment.

At the end of a day, a shop manager connects the portable electronic equipment, in which the sales amount for the day has been stored, to a terminal in connection with a computer at a bank in order to send the information on the sales amount stored in the portable electronic equipment to the computer at the bank.

The electronic money has different types of processing for each different issuer of the electronic money, so that it is necessary to prepare application programs suited for each type or processing. Hence, the application programs are stored in the memory cards, and each type of processing is implemented by changing the memory card to match each transaction system. However, the portable electronic equipment employed for such electronic transaction systems or the like (hereinafter referred to as "memory card insertion type electronic equipment") does not have a function for checking memory cards for authenticity. Therefore, when a memory card is inserted in the memory card insertion type portable electronic equipment, the application program stored in the memory card is implemented even if the application program is an invalid one. Hence, there has been a danger of overwriting the contents of an electronic transaction system.

SUMMARY OF THE INVENTION

Accordingly, it is an object of the present invention to provide a memory card insertion type electronic equipment provided with a function for checking a memory card for authenticity before executing an application program stored in the memory card.

To this end, according to one aspect of the present invention, there is provided a memory card insertion type electronic equipment including: a contact section to which a terminal of a memory card, where authentication data and an application program have been stored, is detachably connected; a control console where a group of operating keys is disposed; and a control unit having means for storing a secret key, and memory card authenticating means that reads authentication data from the memory card connected to the contact portion when a reset key of the control console is pressed, decodes it using the secret key, compares the decoded authentication data with the data read from the application program stored in the memory card, and authenticates the memory card if the comparison result indicates agreement therebetween.

It is another object of the present invention to provide a memory card writing apparatus for generating authentication data for checking a memory card for authenticity and storing it in the memory card.

To this end, according to another aspect of the present invention, there is provided a memory card writing apparatus equipped with: a contact section to which a terminal of a memory card is detachably connected; secret key storing means for storing a secret key; application program storing means for storing an application program; authentication data creating means for creating authentication data by encoding, according to the secret key, a set of information composed of an address of a predetermined number generated at random and data read from the application program storing means according to the address.

DESCRIPTION OF THE PREFERRED EMBODIMENTS

The embodiments in accordance with the present invention will be described with reference to the accompanying

First Embodiment

Figure 2:
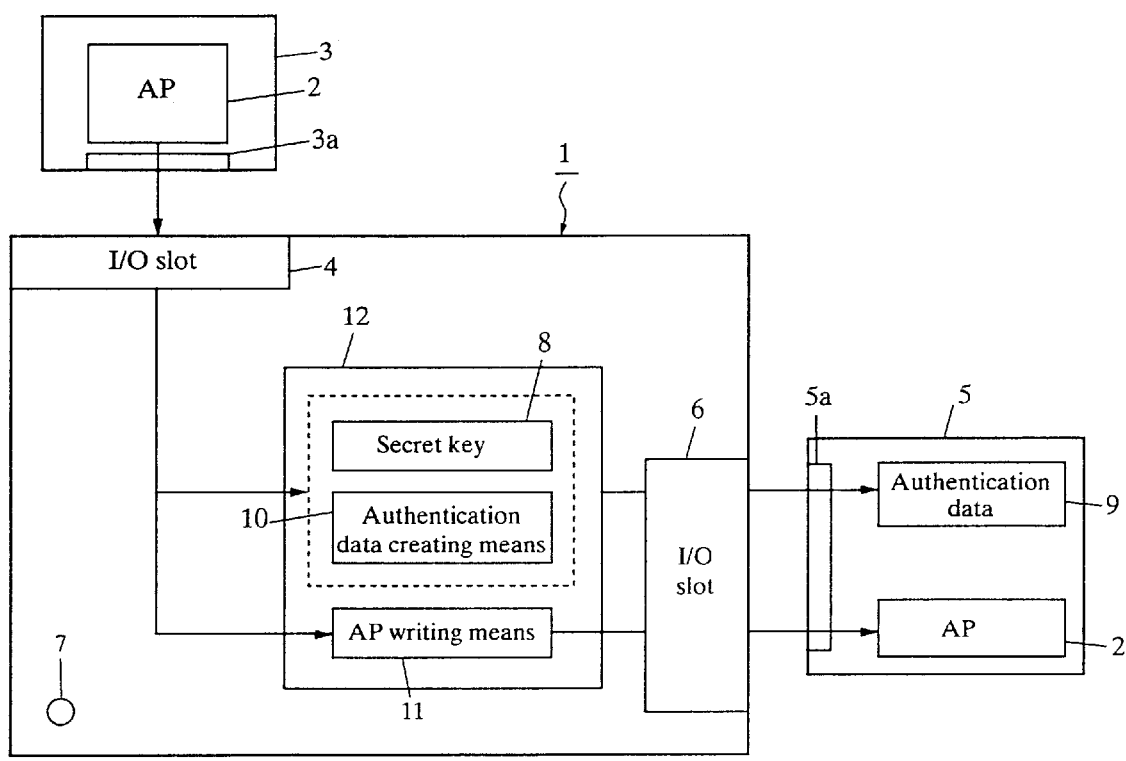
FIG. 2 is a block diagram showing the configuration of a memory card writing apparatus.

FIG. 2 is a block diagram showing the configuration of a memory card writing apparatus. A memory card writing apparatus 1 has an I/O slot 4 into which a card 3, which serves as an application program storing means for storing an application program (hereinafter referred to as "AP") 2 executed by a memory card insertion type electronic equipment to be discussed later, is detachably inserted, an I/O slot 6 into which a memory card 5 is detachably inserted, and a write start switch 7.

The card 3 and the memory card 5 have terminals 3a and 5a to be respectively connected to the I/O slots 4 and 6 which serve as contact sections.

The memory card writing apparatus 1 incorporates an authentication data creating means 10 that randomly selects a set of information of an address and data, for example, of about 1 kilobyte (KB), encodes the set of information by using a secret key 8, and stores it as authentication data 9 in the memory card 5, and an AP writing means 11 for reading the AP 2 from the card 3 and writing it to the memory card 5.

To be more specific, a central processing unit 12 (hereinafter referred to as "CPU 12") executes the authentication data creating program and the AP write program stored in a memory (not shown) to implement the functions of all the means.

To randomly select the set information of an address and data, the AP 2 is read from the card 3 into a memory, then random numbers, for example, are generated to make up the address, and a program for selecting, as the data, a code of the AP 2 called up from the memory in accordance with the address is included in the authentication data creating program.

The card 3 has been employed as the AP storing means; however, a floppy disk or a read-only memory may be used instead.

Figure 3:
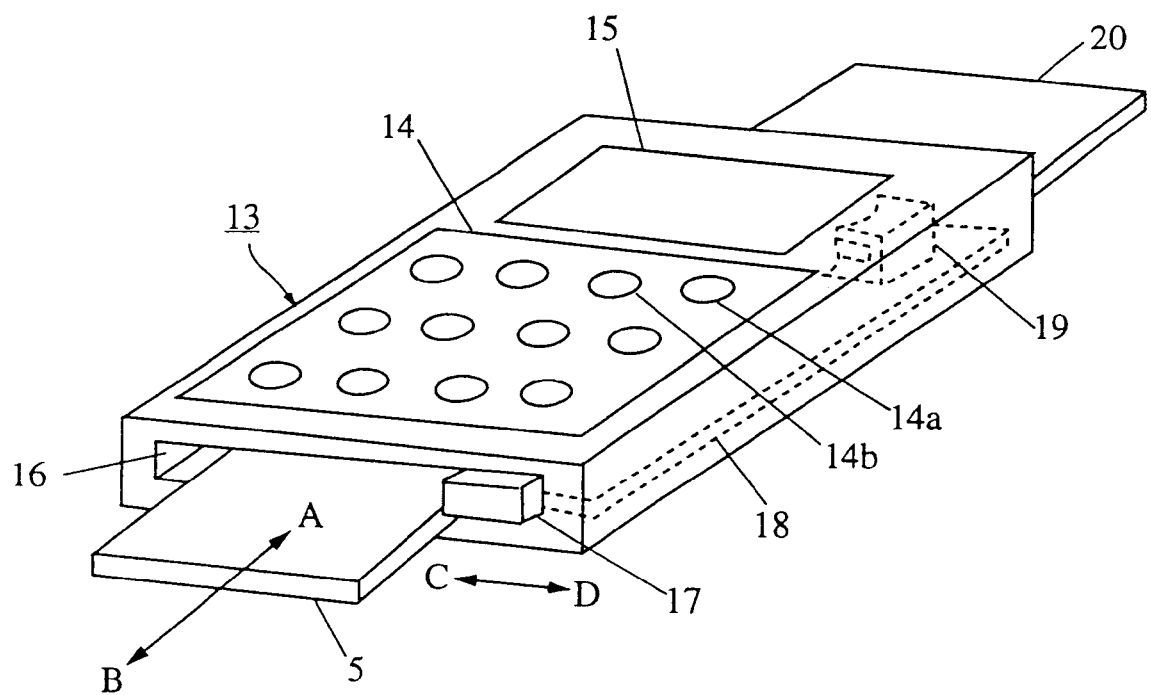
FIG. 3 is a perspective view showing the appearance of a memory card insertion type electronic equipment.
Figure 4:
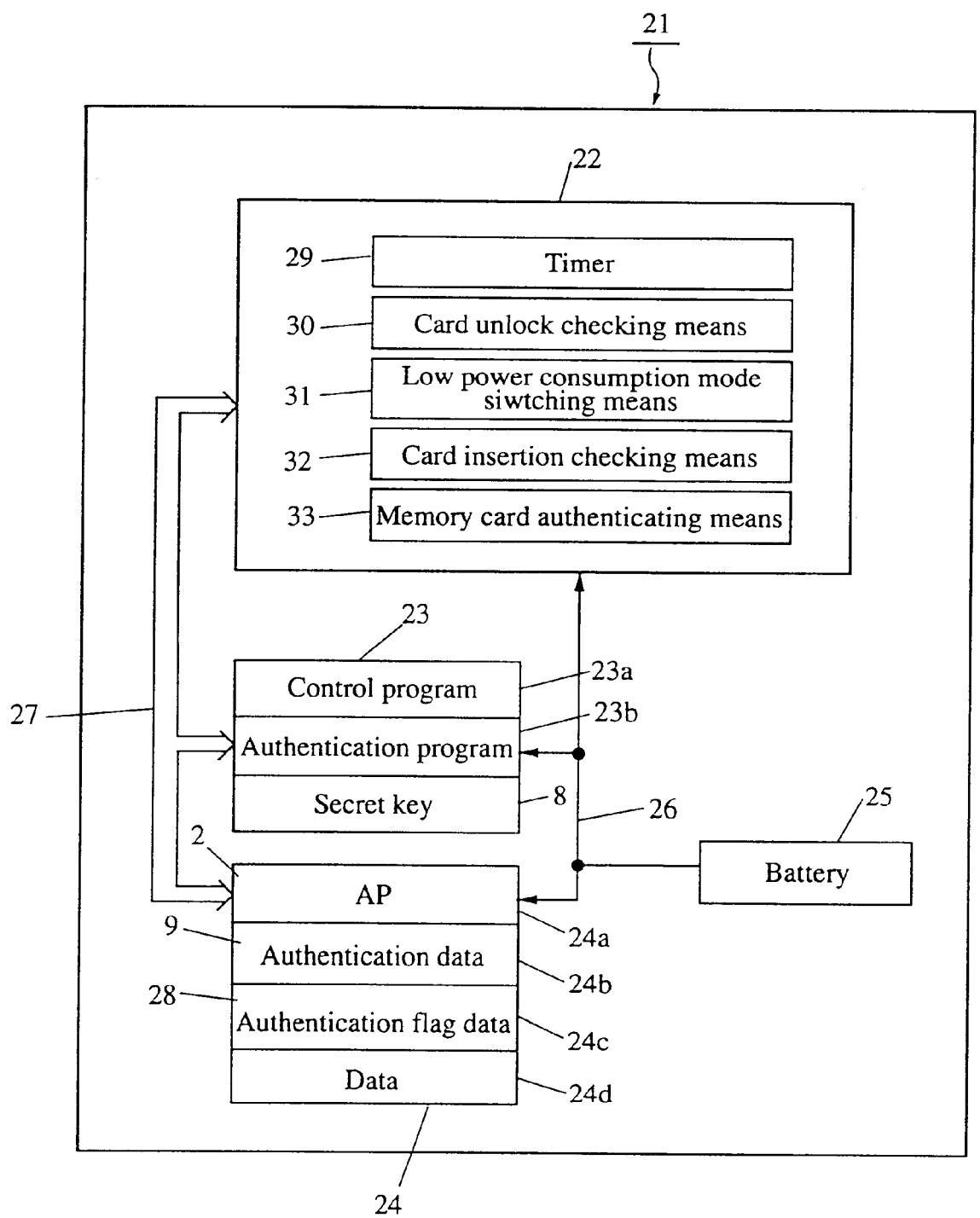
FIG. 4 is a block diagram showing a control section mounted on the memory card insertion type electronic equipment shown in FIG. 3.

FIG. 3 is a perspective view showing the appearance of the memory card insertion type electronic equipment, and FIG. 4 is a block diagram of a control section incorporated in the memory card insertion type electronic equipment shown in FIG. 3. Memory card insertion type electronic equipment 13 such as portable electronic equipment used for an electronic transaction system has a group of control keys 14 and a display 15 functioning as an informing means on the front surface thereof.

Provided on the side surfaces of the memory card insertion type electronic equipment 13 are a memory card inserting slot 16 into which the memory card 5 is detachably inserted in the direction indicated by an arrow A or from which the memory card 5 is removed in the direction indicated by an arrow B, and a slider 17 slidable in the directions indicated by arrows C and D to lock the memory card 5 when it is pushed in the memory card inserting slot 16.

When carrying out an electronic transaction according to the AP 2 stored in the memory card 5, an IC card 20 is inserted in an IC card inserting slot located in the side surface opposed to the side surface where the memory card inserting slot 16 is located.

The group of control keys 14 primarily includes a power key 14a, a reset key 14b, and a ten-key pad. The display 15 displays a message in response to the data entered through the group of control keys 14.

Inside the memory card insertion type electronic equipment 13, a board 18 indicated by dashed lines is installed so that it is parallel to the memory card 5 inserted in the memory card inserting slot 16. Mounted on the board 18 are connector 19 providing a connection with a terminal 5a of the memory card 5 and a control section 21 shown in FIG. 4. The control section 21 is constituted primarily by a central processing unit 22 (hereinafter referred to as "CPU 22"), a read-only memory 23 (hereinafter referred to as "ROM 23"), a random access memory 24 (hereinafter referred to as "RAM 24"), and a battery 25. The battery 25 supplies power to the CPU 22, the ROM 23, and the RAM 24 via a line 26. The CPU 22 is connected to the ROM 23 and the RAM 24 via a bus line 27.

Stored in the ROM 23 are a control program 23a, an authentication program 23b, and a secret key 8. The RAM 24 is provided with an AP storage area 24a, an authentication data storage area 24b, an authentication flag data storage area 24c, and a data storage area 24d. Also stored in these areas, the AP 2 read in from the memory card 5, the authentication data 9, authentication flag data 28 indicative of the authenticity of a memory card, decoding data, and data used for a variety of processing.

The secret key 8 is the same secret key employed for creating authentication data by the memory card writing apparatus 1; it is used for decoding the authentication data 9 of the memory card 5, so that it is protected against an attempt to read it externally.

The CPU 22 executes a control program 23a to implement the functions of a timer 29, a card unlock checking means 30, a low power consumption mode switching means 31, a card insertion checking means 32, etc. The CPU 22 also implements the function of a memory card authenticating means 33 by executing an authentication program 22b.

The low power consumption mode switching means 31 uses the timer 29 to switch the CPU 22 to a hold state when a predetermined time of a wait state has elapsed so as to minimize wasteful power consumption.

The card insertion checking means 32 employs the timer 29 to refer to the contents of a register assigned to one of a group of registers of the CPU 22 during, for example, an interrupt processed at every second so as to check the connection of the connector to which the terminal 5a of the memory card 5 is inserted.

When the slider 17 is moved in the direction indicated by the arrow D, a contact of a switch (not shown) comes in contact with a grounding terminal of a circuit to effect low level. This causes a non-maskable interrupt signal (NMI) to be sent to the CPU 22, and the card unlock checking means 30 clears the contents of the authentication flag data storage area 24c.

Figure 5:
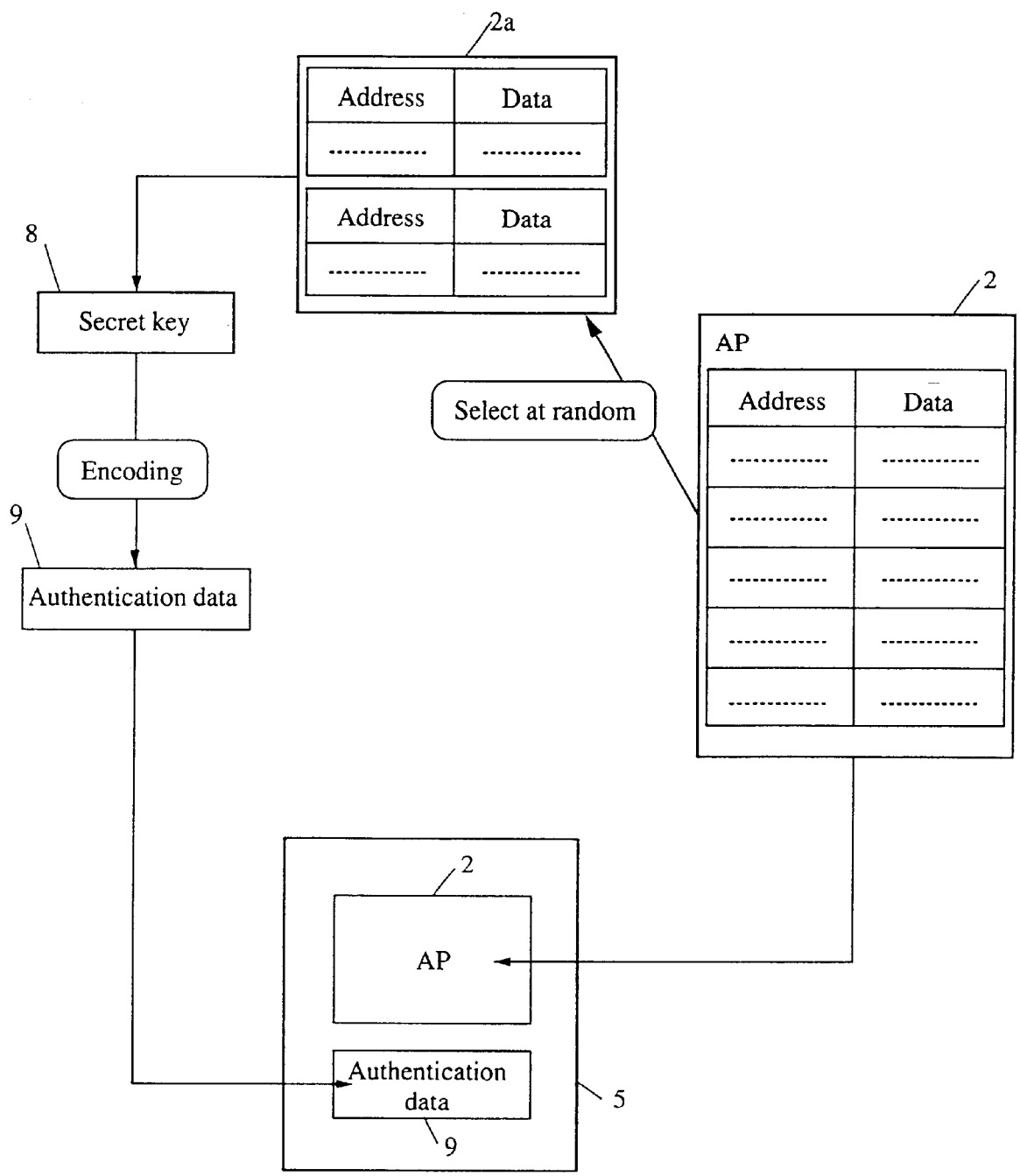
FIG. 5 is a schematic representation illustrating the operation of a memory card writing apparatus.

The operation will now be described. First, the operation of the memory card writing apparatus 1 will be described with reference to FIG. 5. The card 3 in which the AP 2 has been stored and the memory card 5 to which nothing has been written yet are inserted in the I/O slots 4 and 6, respectively, and the write start switch 7 is pressed. The CPU 12 initiates the function of the AP writing means 11 to read the AP 2 from the card 3 into a memory (not shown) and to write the stored application program to the memory card 5.

Then, the CPU 12 implements the function of the authentication data creating means 10 to generate an address at random, read data from the AP 2 of the memory according to the address, 40 encode a set of information 2a composed of the address and data by using the secret key 8, and write the encoded information as the authentication data 9 to the memory card 5.

Figure 1:
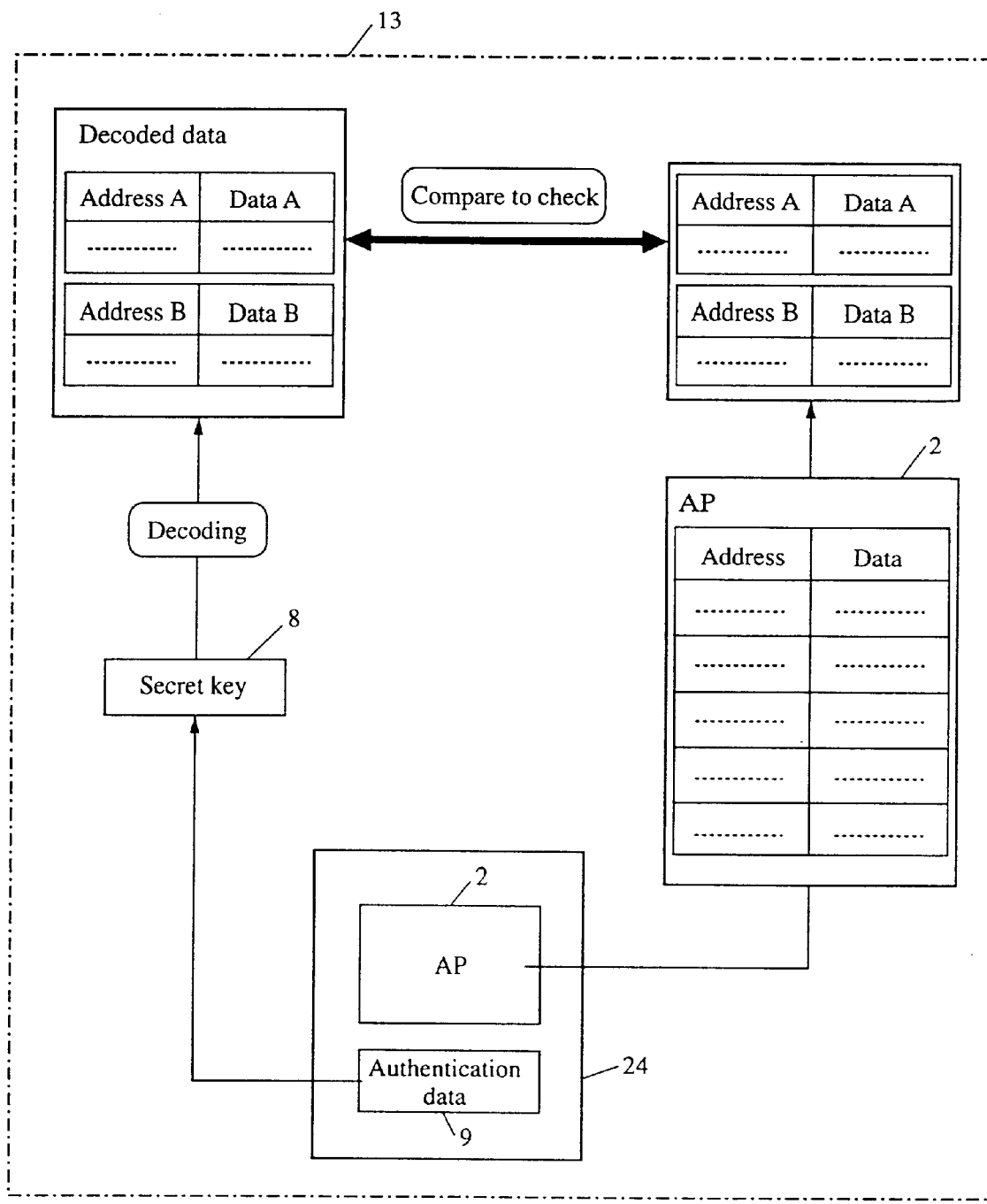
FIG. 1 is a schematic representation illustrating a memory card authentication processing in accordance with a first embodiment.
Figure 6:
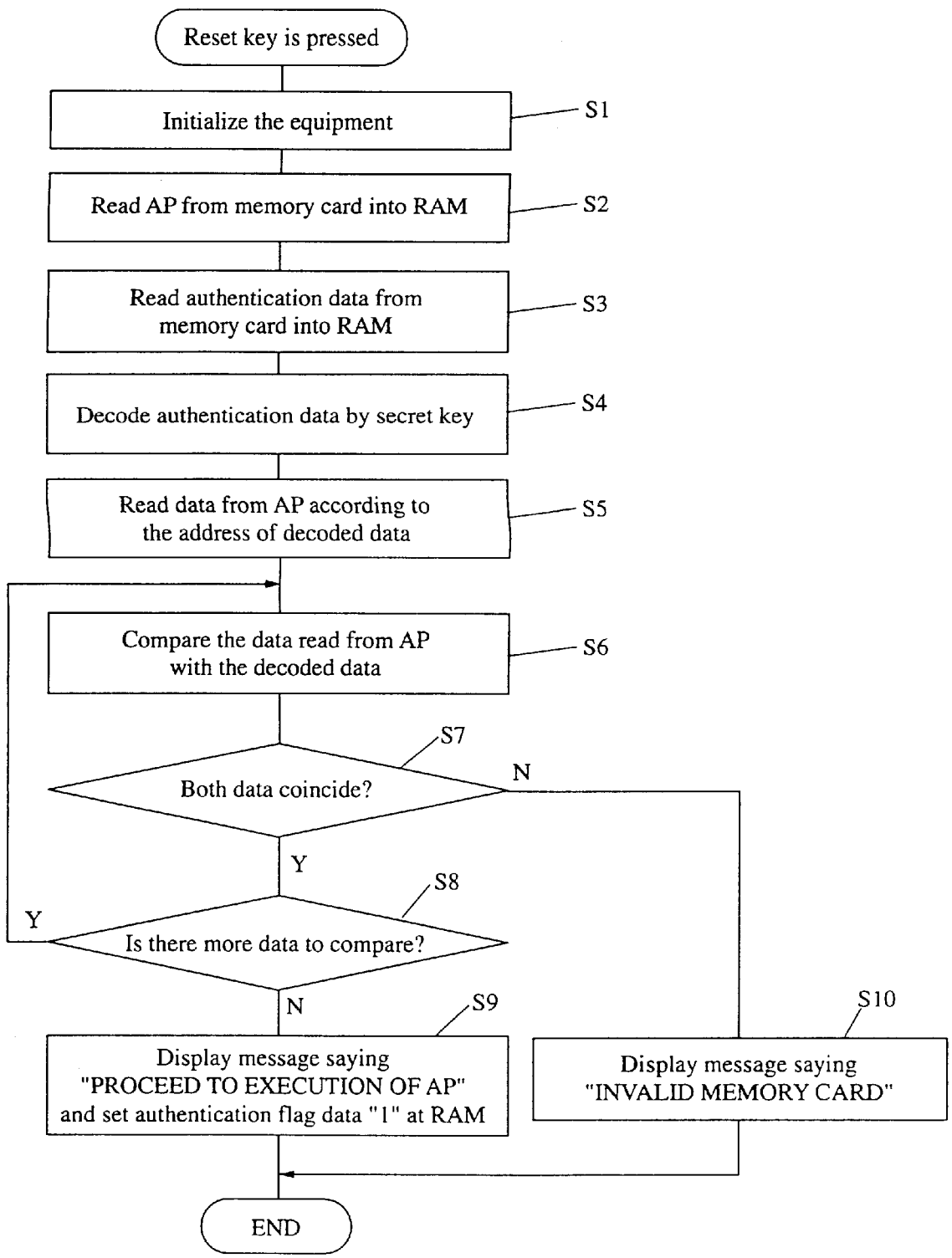
FIG. 6 is a flowchart showing the operation of the first embodiment after a reset key is pressed.

Referring now to FIG. 1 and FIG. 6, the processing for authenticating a memory card will be described. FIG. 1 is a schematic representation illustrative of the memory card authentication processing in accordance with the first embodiment, and FIG. 6 is a flowchart illustrative of the operation of the first embodiment after the reset key is pressed.

As shown in FIG. 3, the memory card 5 is inserted in the memory card slot 16 of the memory card insertion type electronic equipment 13 in the direction indicated by the arrow A, and the terminal 5a shown in FIG. 2 is inserted in the connector 19 of the memory card insertion type electronic equipment 13 and locked by the slider 17.

In the memory card insertion type electronic equipment 13, when the power key 14a is pressed and the reset key 14b is pressed, a reset signal is applied to the reset terminal of the CPU 22 in a step S1 to engage the low level so as to initialize the memory card insertion type electronic equipment 13.

In a step S2, the CPU 22 stores the AP 2, which has been read out from the memory card 5, in the AP storage area 24a of the RAM 24 as shown in FIG. 4.

In a step S3, the CPU 22 stores the authentication data 9, which has been read out from the memory card 5, in the authentication data storage area 24b of the RAM 24.

In a step S4, the CPU 22 implements the function of the memory card authenticating means 33 to authenticate the memory card 5; it reads out the authentication data 9 from the RAM 24, decodes the read data by using the secret key 8, and stores it as decoded set of information in the data storage area 24d of the RAM 24 as shown in FIG. 1.

In a step S5, the CPU 22 reads the data from the AP 2 stored in the AP storage area 24a of the RAM 24 in accordance with the address in the decoded set of information, and stores the read data in the data storage area 24d.

In a step S6, the CPU 22 compares the data read from the AP 2 with the data of the decoded set of information. The CPU 22 branches to a step S8 if the comparison result indicates agreement between the two pieces of data in a step S7, or the CPU 22 branches to a step SO if the comparison result indicates disagreement therebetween in the step S7.

In the step S8, the CPU 22 checks whether there is more data to compare, and if it decides that there is more data, then it goes to the step S6, or if it decides that there is no more data, then it goes to a step S9. In the step S9, the CPU 22 sets "1" in the authentication flag data storage area 24c of the RAM 24 and displays a message indicating that it is ready to execute the AP on the display 15 before it terminates the processing for authenticating the memory card 5.

The execution of the AP has been described in conjunction with an associated technique; hence, the explanation thereof will be omitted.

In a step S10, the CPU 22 displays a message indicating that the memory card is invalid on the display 15, and terminates the processing for authenticating the memory card 5.

Figure 7:
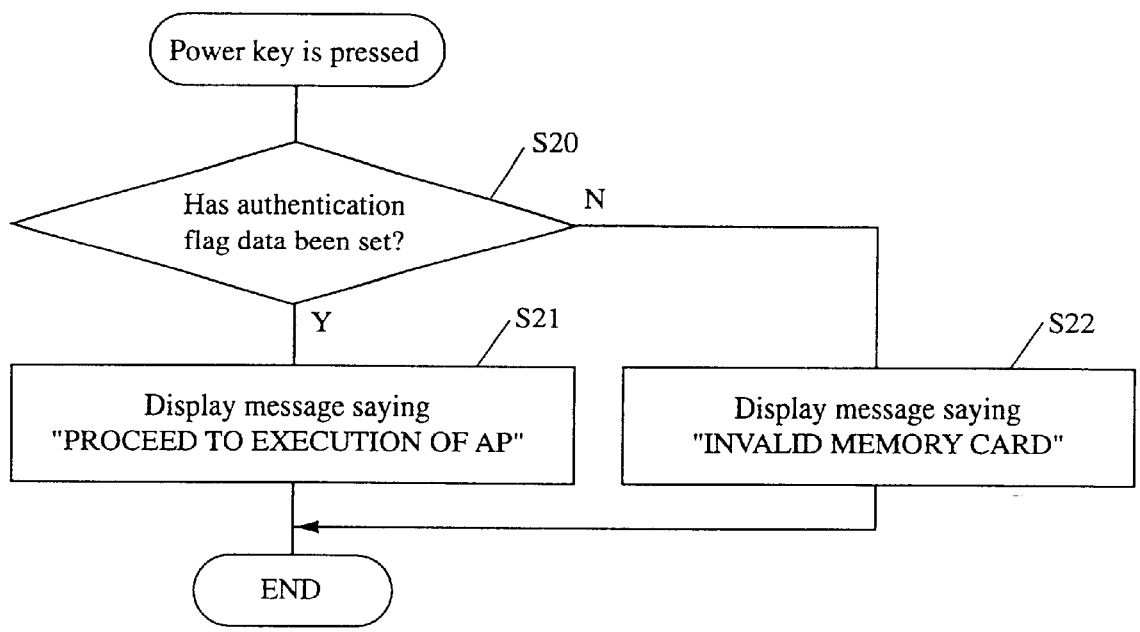
FIG. 7 is a flowchart showing the operation of the first embodiment after a memory card has been authenticated.

Referring now to FIG. 7, the operation following the memory card authentication will be described. FIG. 7 shows the flowchart illustrative of the operation after the memory card authentication according to the first embodiment. When the power key 14a is pressed, the CPU 22 works as the memory card authenticating means 33 in a step S20 and checks whether "1" has been set in the authentication flag data storage area 24c of the RAM 24; if the check result is affirmative, then the CPU 22 branches to a step S21, or if the check result is negative, then it branches to a step S22.

In the step S21, the CPU 22 displays a message indicating that it is ready to implement the AP on the display 15, then terminates the processing for authenticating the memory card 5. In a step S22, the CPU 22 displays a message indicating that the memory card is counterfeit, then terminates the processing for authenticating the memory card 5.

Hence, if the power is turned OFF after the reset key 14b has been pressed to initialize the apparatus and the AP has been implemented, then the apparatus becomes ready for operation simply by pressing the power key 14a.

Figure 8:
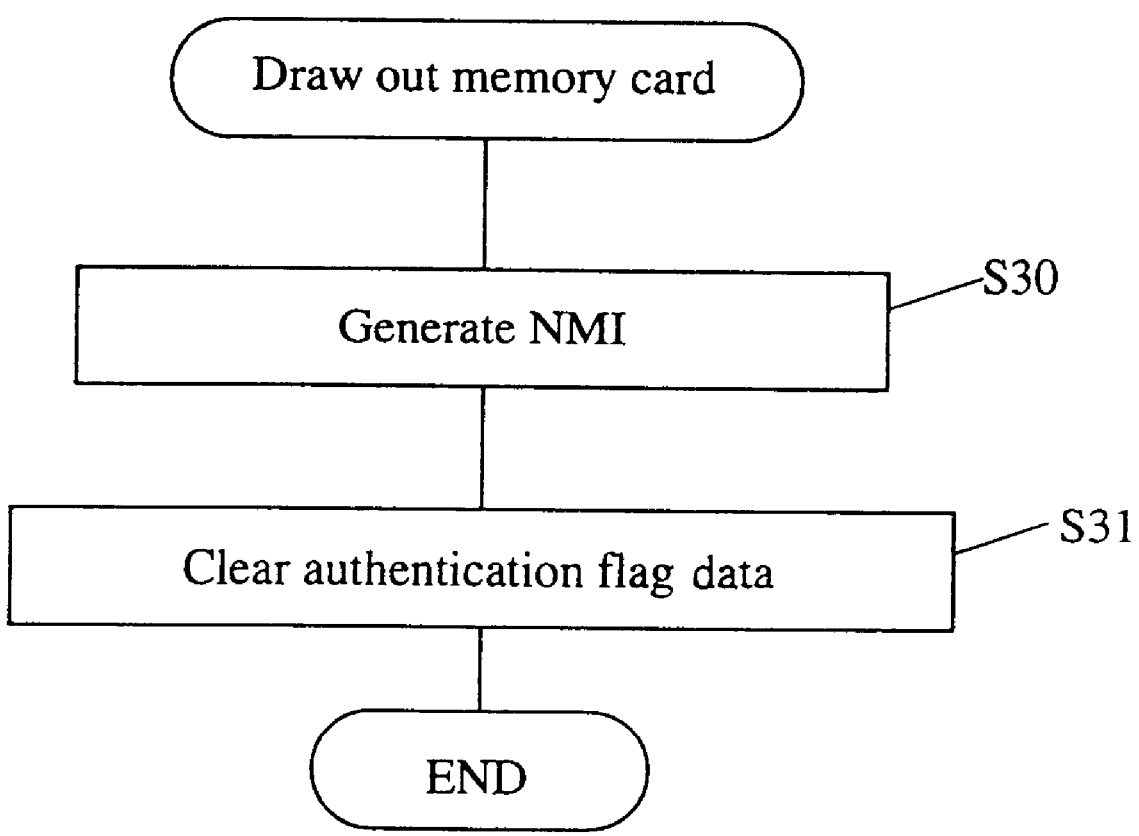
FIG. 8 is a flowchart showing the operation after a card lock has been released.

Referring now to FIG. 8, the operation after the card lock has been released will be described. When the CPU 22 is serving as the card unlock checking means 30, if an interrupt signal (NMI) is encountered in step S30, then the CPU 22 clears the contents of the authentication flag data storage area 24c of the RAM 24 in a step S31 and displays a message indicating that it has cleared the authentication flag data on the display 15 before it terminates the processing.

When the card is unlocked by sliding the slider 17 in the direction indicated by the arrow D to pull out the memory card 5 from the apparatus after implementing the AP processing, the contents of the authentication flag data storage area 24c of the RAM 24 becomes "0"; therefore, before implementing the AP next time, the power key 14a and the reset key 14b must be pressed.

When the CPU 22 is functioning as the low power consumption mode switching means 31, the timer 29 is actuated to switch the CPU 22 to the hold status when a predetermined time of the wait state elapses thereby to minimize wasteful power consumption.

The first embodiment makes it possible to achieve a system that enables a user-writable memory card with security by supplying the memory card writing apparatus from a vendor of the apparatus to a trustworthy user such as a system vendor or a software house by letting the user manage the apparatus.

Further, the first embodiment prevents an unauthorized AP from being implemented since a set of information composed of a randomly generated address and the data read out from an AP in accordance with the address is encoded. The encoded data is stored as authentication data in a memory card. The authentication data is decoded to the set of information by the memory card insertion type electronic equipment, the data is read out from the AP according to the address of the set of information; and the read data is compared with the data of the decoded set of information to check the memory card for authentication.

Moreover, the authenticity of a memory card can be checked even if the information on an AP has not been installed on the memory card insertion type electronic equipment. Hence, even if the AP has been modified by upgrading or the like, the memory card after the modification can be checked for authenticity without the need of making any change in the memory card insertion type electronic equipment.

Furthermore, once a memory card has been authenticated after pressing the reset key, the authenticity of a memory card can be checked simply by checking the authentication flag data by pressing the power key. This shortens the time required for checking the authenticity.

In addition, when a memory card is drawn out from the memory card insertion type electronic equipment, the authentication flag data is cleared. Therefore, if a counterfeit memory card should be inserted in the memory card insertion type electronic equipment and the power key is pressed, the equipment will give a message indicating that it is an invalid memory card, thus preventing the use of the counterfeit memory card.

Second Embodiment

Figure 9:
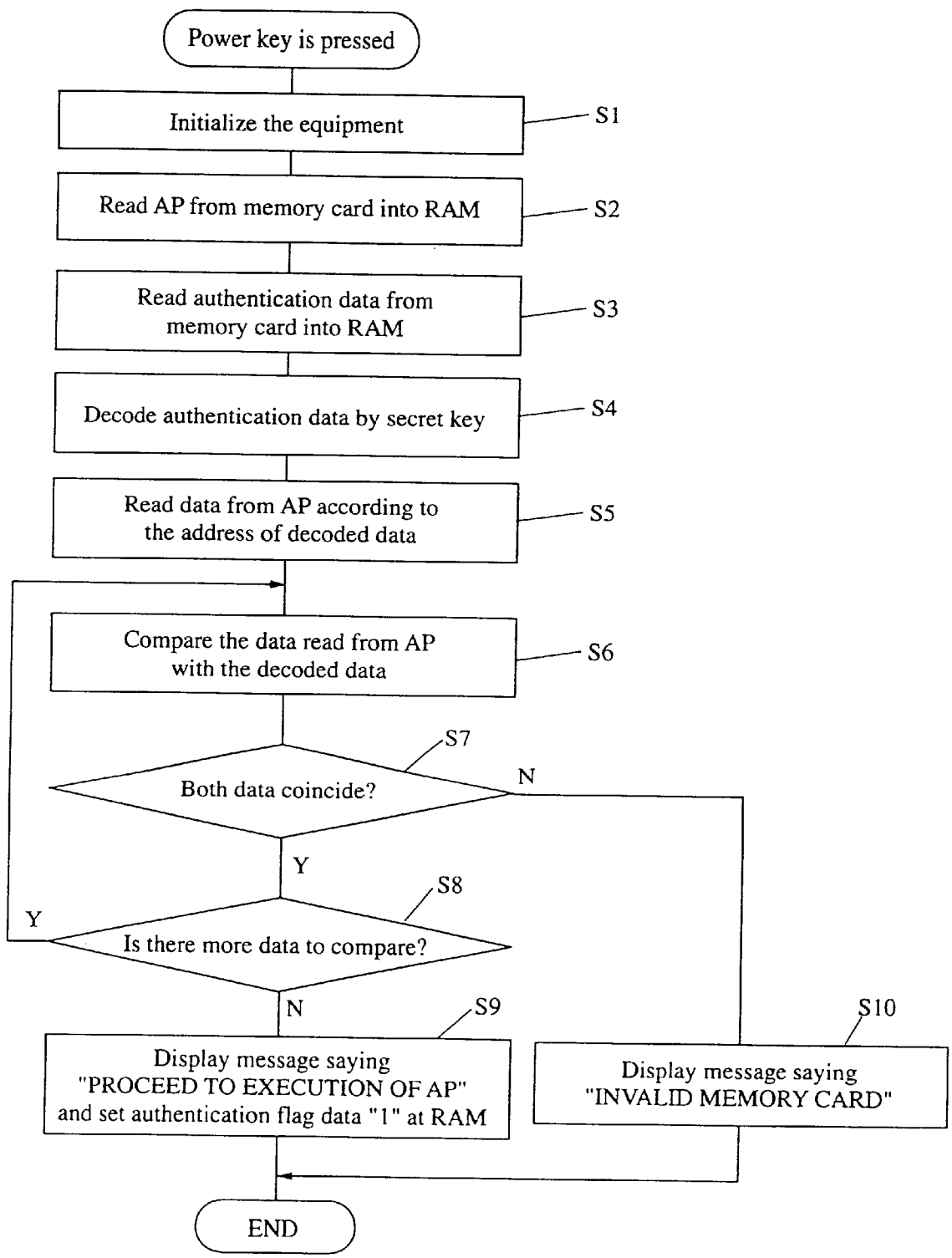
FIG. 9 is a flowchart showing the operation of a second embodiment after a power key has been pressed.

FIG. 9 shows a flowchart indicative of the operation of a second embodiment after the power key is pressed. The memory card authenticating procedure of the second embodiment is different from that of the first embodiment in that a power key 14a serves also as the reset key, and each time the power key 14a is pressed, power is supplied to the apparatus and a reset signal is applied to a reset terminal of a CPU 22 at the same time to engage the low level so as to initialize the memory card insertion type electronic equipment 13.

According to the second embodiment, each time the memory card insertion type electronic equipment is initialized, that is, each time the power key is pressed, the CPU carries out the memory card authenticating procedure. This feature provides higher security than that provided by the set of authentication flag data in the first embodiment, eliminating the danger of an unauthorized application program being executed.

Third Embodiment

Figure 10:
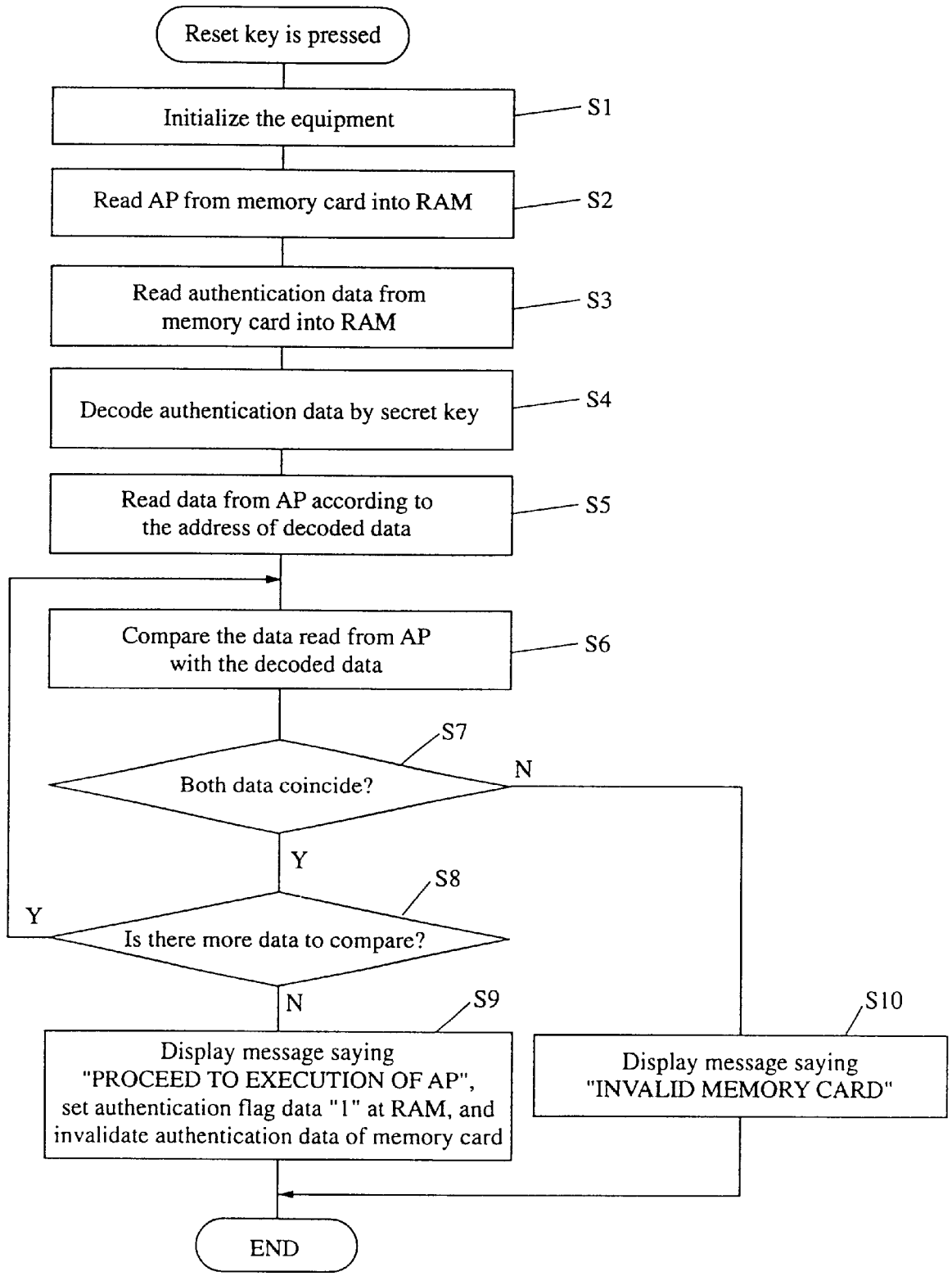
FIG. 10 is a flowchart showing the operation of a third embodiment after a reset key has been pressed.

FIG. 10 shows a flowchart illustrating the operation of a third embodiment after the reset key is pressed. The third embodiment differs from the first embodiment in the processing for authenticating a memory card 5 where the authentication processing is started by pressing the reset key. In the third embodiment, if the memory card 5 has been proven authentic by the authentication procedure, then the CPU sets "1" in an authentication flag data storage area 24c in a RAM 24 and invalidates authentication data 9 of the memory card 5. To be more specific, for example, a valid bit and an invalid bit are written to an authentication flag data storage area 24c, and once a memory card has been proven authentic, the invalid bit is written.

The operation of the third embodiment will be omitted because it is identical to that of the first embodiment.

According to the third embodiment, after a memory card has been authenticated, the authentication data of the memory card is invalidated thereby to disable the reuse the memory card that has been once authenticated or the use of an invalid copy thereof on other memory card insertion type electronic equipment. Further, reading from the memory card, which has been shipped by being inserted in the memory card insertion type electronic equipment, will be also disabled, so that the manufacture of counterfeit memory cards can be prevented.

Fourth Embodiment

A fourth embodiment differs from the first embodiment in that a secret key 34 is used to encode an address into an authentication address and to convert data into a hash value (hereinafter referred to as "authentication hash value") to create authentication data 9 by a memory card writing apparatus 1.

A hash value is usually a value obtained by a hash function for compressing variable-length data to turn it into arbitrary fixed-length data. Original data can not be restored by reverse processing.

A memory card insertion type electronic equipment 13 decodes the authentication address by employing the secret key 34, and data is read from an AP 2 according to the decoded address; it then determines the hash value by the secret key 34 (hereinafter referred to as "comparison hash value"), and compares the determined comparison hash value with the authentication hash value to check a memory card 5 for authenticity.

In the conversion of the authentication hash value and the comparison hash value, if a plurality of pieces of data before conversion are respectively composed of 64 bytes, then the converted authentication hash value and comparison hash value will be compressed to a single 8-byte piece of data.

Figure 11:
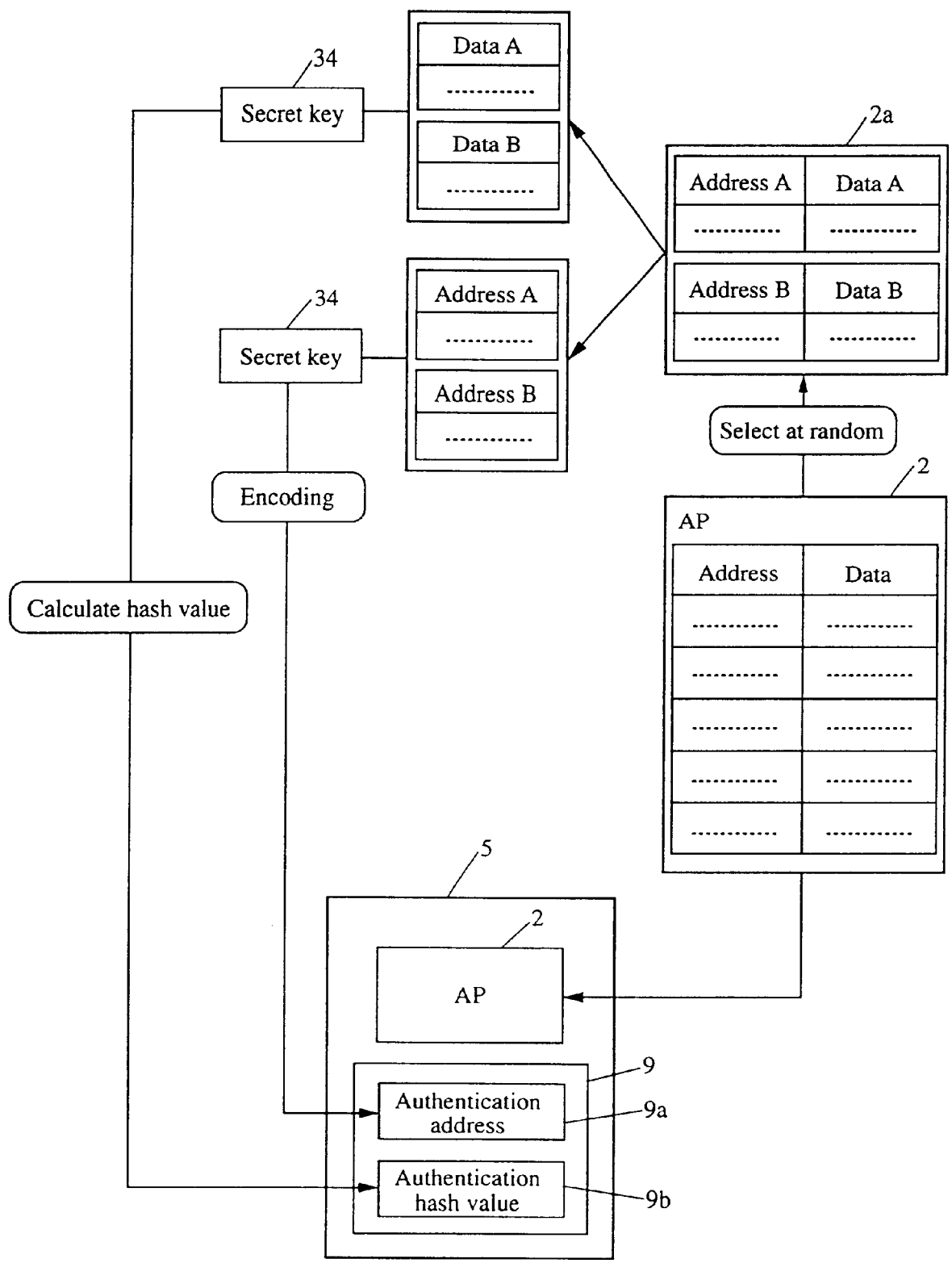
FIG. 11 is a schematic representation showing the operation of a memory card writing apparatus in accordance with a fourth embodiment.

FIG. 11 is a schematic representation illustrative of the operation of the memory card writing apparatus in accordance with a fourth embodiment. First, as shown in FIG. 2, a card 3 in which the AP 2 has been stored and a blank card memory card 5 are inserted in I/O slots 4 and 6, respectively, and a write start switch 7 is pressed.

A CPU 12 functions as an AP writing means 11 to read the AP 2 from the card 3 and to write the application program AP to the memory card 5 as shown in FIG. 11.

The CPU 12 then functions as an authentication data creating means 10 to randomly select a set of information 2a composed of an address and data from the read AP 2, to create the authentication data 9 using a secret key 34 according to the set of information 2a, and to store the created authentication data 9 in the memory card 5 as in the case of the first embodiment.

Of the set of information 2a, the address is encoded using the secret key 34 and stored as an authentication address 9a in the memory card 5. Similarly, the data is converted to a hash value using the secret key 34 and stored as an authentication hash value 9b in the memory card 5.

Figure 12:
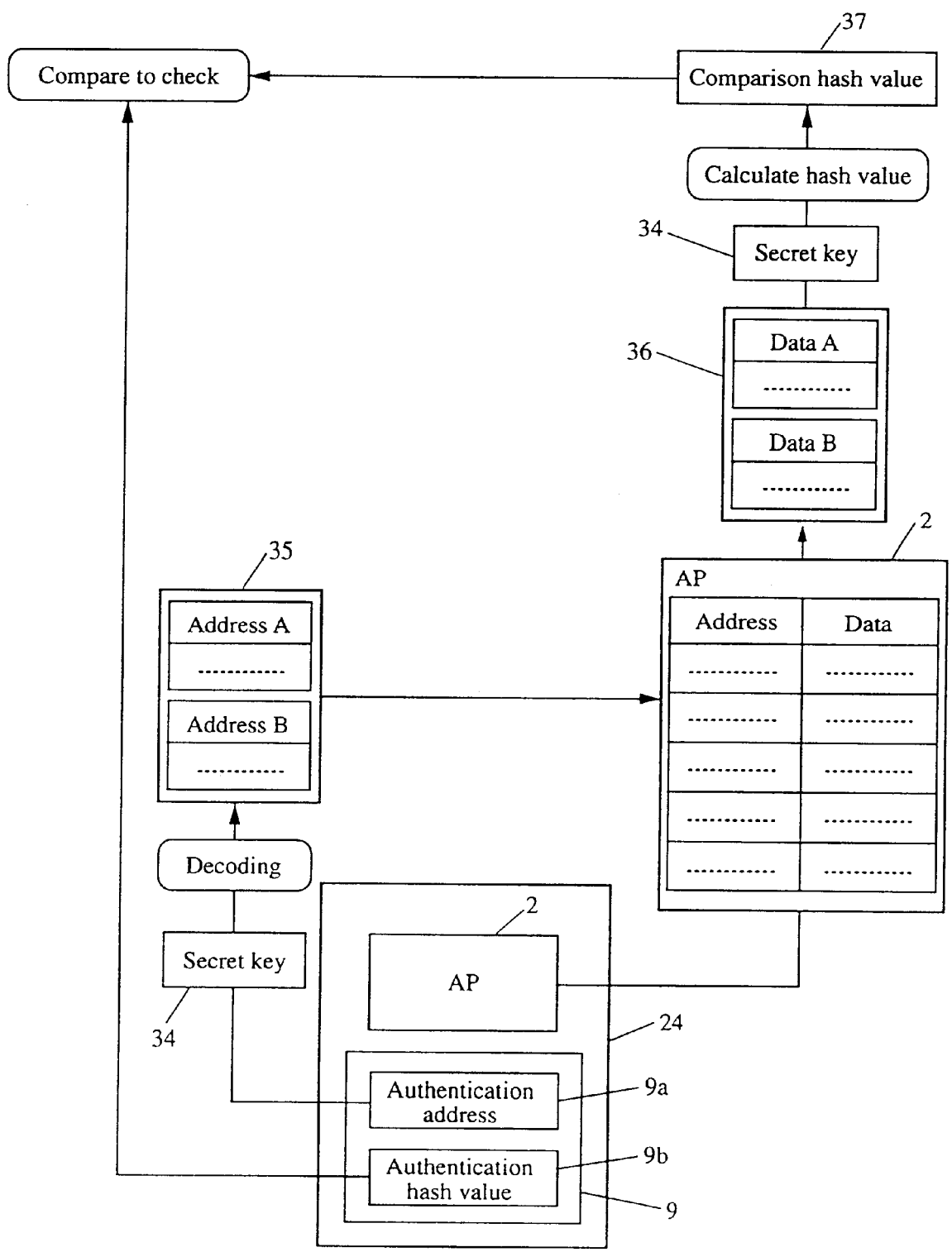
FIG. 12 is a schematic representation of the memory card authenticating operation of the fourth embodiment.
Figure 13:
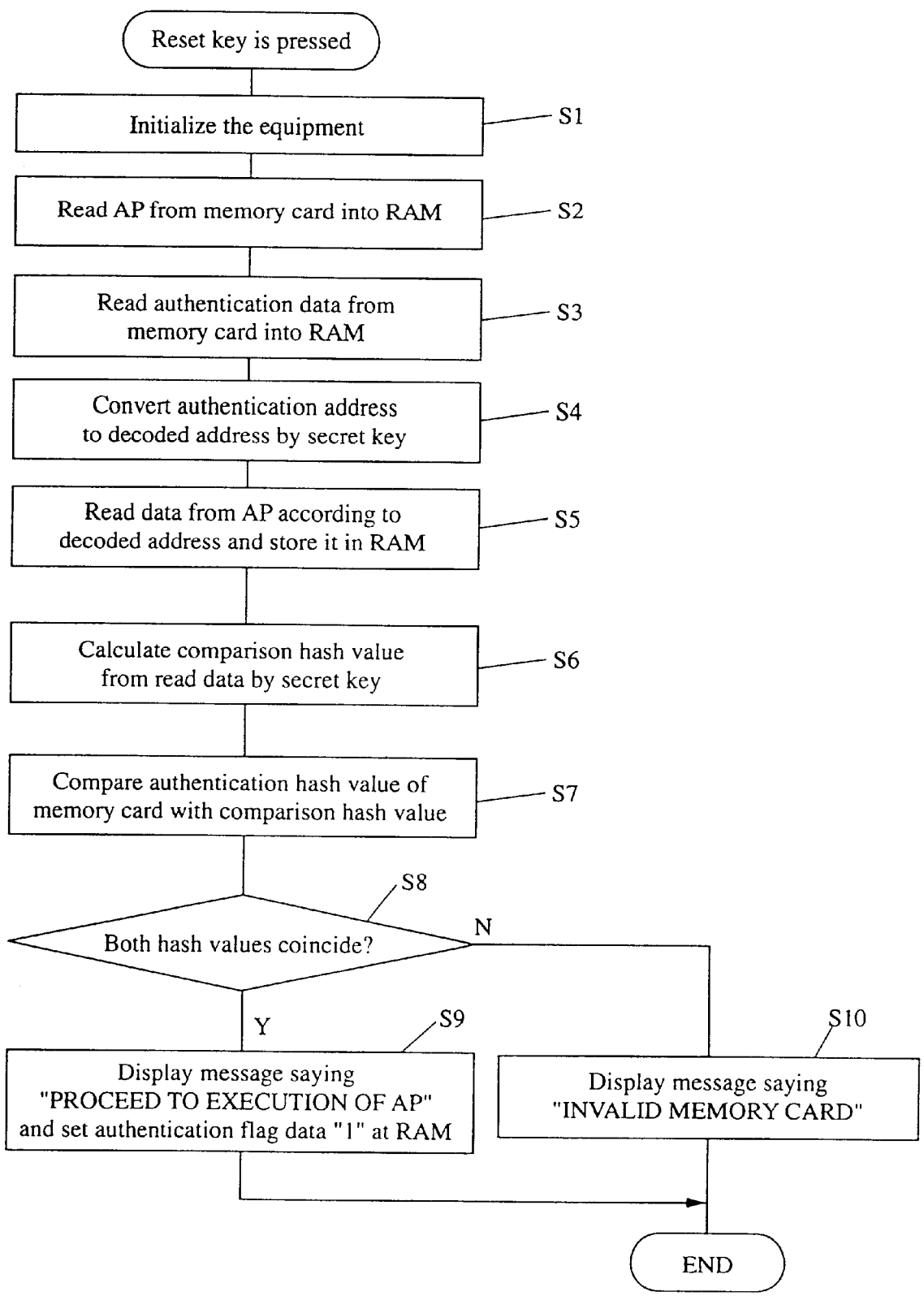
FIG. 13 is a flowchart showing the operation of the fourth embodiment after a reset key has been pressed.

FIG. 12 is a schematic representation illustrative of the memory card authenticating procedure in accordance with the fourth embodiment. FIG. 13 shows the flowchart illustrative of the operation of the fourth embodiment after the reset key is pressed.

As shown in FIG. 3, the memory card 5 is inserted in a memory card slot 16 of the memory card insertion type electronic equipment 13 in the direction indicated by an arrow A, and a terminal 5a shown in FIG. 2 is inserted to a connector 19 of the memory card insertion type electronic equipment 13 and locked by a slider 17.

In the memory card insertion type electronic equipment 13, when a power key 14a is pressed and a reset key 14b is then pressed, a CPU 22 initializes the memory card insertion type electronic equipment 13 in a step S1.

In a step S2, the CPU 22 stores the AP 2, which has been read from the memory card 5, in an AP storage area 24a of a RAM 24 as shown in FIG. 4.

In a step S3, the CPU 22 stores the authentication data 9, which has been read from the memory card 5, in an authentication data storage area 24b of the RAM 24.

In a step S4, the CPU 22 functions as a memory card authenticating means 33 to implement the memory card authenticating procedure. More specifically, the CPU 22 reads the authentication address 9a from the RAM 24 and decodes it using the secret key 34 and stores it as a decoded address 35 in a data storage area 24d of the RAM 24.

In a step S5, the CPU 22 reads out the data from the AP 2, which has been stored in the RAM 24, according to the decoded address 35 and stores it as a group of data 36 in the data storage area 24d.

In a step S6, the CPU 22 uses the secret key 34 to calculate the hash value from the group of data 36 and stores it as a comparison hash data 37 in the data storage area 24d of the RAM 24. In a step S7, the CPU 22 reads out the authentication hash value 9b and the comparison hash value 37 from the RAM 24 to compare these two values. If the comparison result of the two values indicates agreement in a step S8, then the CPU 22 branches to a step S9, or if the comparison result indicates disagreement, then the CPU 22 branches to a step S10.

In the step S9, the CPU 22 displays a message indicating that it will moves onto the execution of the AP on a display 15, and sets "1" in the authentication flag data storage area 24c of the RAM 24 before terminating the memory card authentication processing.

A hash value has been used in this embodiment; however, it may alternatively be a message authentication code (MAC) that conforms to the second edition of ISO/IEC 9797 issued on Apr. 15, 1994 (International Organization For Standardization/International Electrotechnical Commission 9797, second edition, issued on Apr. 15, 1994).

According to the fourth embodiment, since the hash values are stored as the authentication hash value in the memory card, the size of the authentication data to be loaded on the memory card can be considerably reduced as compared with the first embodiment.

What is claimed is:

1. An electronic memory card insertion device comprising:

a contact section to which a terminal of a memory card is detachably connected, said memory card having authentication data and an application program stored therein;

a reset key;

a control unit having secret key storing means for storing a secret key, and memory card authenticating means for reading said authentication data from said memory card connected to said contact section when the reset key is pressed, wherein said authentication data is composed of an address, which has been encoded by said secret key, and an authentication hash value created by coding data, which has been read from said application program according to said address before the data is encoded, by said secret key and a predetermined algorithm; and said memory card authenticating means reads out authentication data from said memory card connected to said contact section so as to decode said address using said secret key, converts the data, which has been read from said application program according to said decoded address, into a comparison hash value by using said secret key and said algorithm, and authenticates said memory card if the result of the comparison of said comparison hash value with said authentication hash value indicates agreement therebetween; and a power supply for supplying electric power to said contact section, said reset key and said control unit;

whereby said electronic memory card insertion device checks said memory card for authenticity before executing said application program.

2. A memory card used for the electronic memory card insertion device according to claim 1, wherein said memory card carries an application program and authentication data created based on said application program.

3. An electronic memory card insertion device comprising:

a contact section to which a terminal of a memory card is detachably connected, said memory card having authentication data and an application program stored therein;

a reset key;

a power key;

a control unit having secret key storing means for storing a secret key, and memory card authenticating means for reading said authentication data from said memory card connected to said contact section when the reset key is pressed, wherein said memory card authenticating means further decodes said read authentication data by using said secret key, compares said decoded authentication data with data read from said application program stored in said memory card, and authenticates said application program stored in said memory card if the comparison result indicates agreement therebetween; and a power supply for supplying electric power to said contact section, said reset key and said control unit;

whereby said electronic memory card insertion device checks said memory card for authenticity before executing said application program, and wherein said control unit further comprises authentication flag data storing means for storing authentication flag data indicating whether said memory card is authentic or not, and when said power supply is turned OFF, said memory card authenticating means checks the contents of said authentication flag data storing means when the power key is pressed, and authenticates said memory card if the memory card authenticating means finds that authentication flag data indicating that said memory card is authentic has been stored.

4. An electronic memory card insertion device according to claim 3, further comprising a locking section for locking said memory card to said contact section, wherein said control unit is provided with card unlock checking means for clearing the contents of said authentication flag data storing means by an interrupt signal issued when said locking section is unlocked.

5. An electronic memory card insertion device according to claim 3, wherein said memory card authenticating means writes said authentication flag data indicting that said memory card is authentic to said authentication flag data storing means and invalidates said authentication data of said memory card.

6. An electronic memory card insertion device comprising:

a contact section to which a terminal of a memory card is detachably connected, said memory card having authentication data and an application program stored therein;

a control console where a group of operating keys is disposed;

a control unit having secret key storing means for storing a secret key, and memory card authenticating means for reading said authentication data from said memory card connected to said contact section when a reset key of said control console is pressed, wherein said authentication data is composed of an address, which has been encoded by said secret key, and an authentication hash value created by coding data, which has been read from said application program according to said address before the data is encoded, by said secret key and a predetermined algorithm; and said memory card authenticating means reads out authentication data from said memory card connected to said contact section so as to decode said address using said secret key, converts the data, which has been read into a comparison hash value by using said secret key and said algorithm, and authenticates said memory card if the result of the comparison of said comparison hash value with said authentication hash value indicates agreement therebetween; and a power supply for supplying electric power to said contact section, said control console, and said control unit;

whereby said electronic memory card insertion device checks said memory card for authenticity before executing said application program.

7. A memory card used for the electronic memory card insertion device according to claim 6, wherein said memory card carries an application program and authentication data created based on said application program.

8. An electronic memory card insertion device comprising:
- a contact section to which a terminal of a memory card is detachably connected, said memory card having authentication data and an application program stored therein;
- a control console where a group of operating keys is disposed;
- a control unit having secret key storing means for storing a secret key, and memory card authenticating means for reading said authentication data from said memory card connected to said contact section when a reset key of said control console is pressed, wherein said memory card authenticating means further decodes said read authentication data by using said secret key, compares said decoded authentication data with data read from said application program stored in memory card, and authenticates said memory card if the comparison result indicates agreement therebetween; and
- a power supply for supplying electric power to said contact section, said control console, and said control unit;
- wherein said control unit further comprises authentication flag data storing means for storing authentication flag data indicating whether said memory card is authentic or not, and when said power supply is turned OFF, said memory card authenticating means checks the contents of said authentication flag data storing means when a power key of said control console is pressed, and authenticates said memory card if the memory card authenticating means finds that authentication flag data indicating that said memory card is authentic has been stored;
- whereby said electronic memory card insertion device checks said memory card for authenticity before executing said application program.

9. An electronic memory card insertion device according to claim 8, further comprising a locking section for locking said memory card to said contact section, wherein said control unit us provided with card unlock checking means for clearing the contents of said authentication flag data storing means by an interrupt signal issued when said locking section is unlocked.

10. An electronic memory card insertion device according to claim 9, wherein said memory card authenticating means writes said authentication flag data indicting that said memory card is authentic to said authentication flag data storing means and invalidates said authentication data of said memory card.

* * * * *